(12) United States Patent
Yasui (10) Patent No.: US 10,277,759 B1
(45) Date of Patent: Apr. 30, 2019

(54) IMAGE PROCESSING DEVICE AND METHOD

(71) Applicant: FUJI XEROX CO., LTD., Tokyo (JP)

(72) Inventor: Osamu Yasui, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 0 days.

(21) Appl. No.: 15/976,976

(22) Filed: May 11, 2018

(30) Foreign Application Priority Data

Oct. 17, 2017 (JP) .................................. 2017-200739

(51) Int. Cl.
*H04N 1/00* (2006.01)

(52) U.S. Cl.
CPC ....... *H04N 1/00639* (2013.01); *H04N 1/0075* (2013.01); *H04N 1/00726* (2013.01)

(58) Field of Classification Search
USPC ........................................................ 358/1.14
See application file for complete search history.

(56) References Cited

U.S. PATENT DOCUMENTS

2018/0084141 A1* 3/2018 Kanai .................. G06F 3/1205

FOREIGN PATENT DOCUMENTS

| JP | 2012-151586 A | 8/2012 |
|---|---|---|
| JP | 2016-158113 A | 9/2016 |
| JP | 2017-061385 A | 3/2017 |

* cited by examiner

*Primary Examiner* — Neil R McLean
*Assistant Examiner* — Darryl V Dottin
(74) *Attorney, Agent, or Firm* — Sughrue Mion, PLLC (57) ABSTRACT

An image processing device includes: a fold unit that folds an adjustment sheet based on a predetermined reference fold position; a punch hole former that forms a punch hole in a stacked portion of the adjustment sheet, created as a consequence of folding of the adjustment sheet; an image reader that reads an image of the adjustment sheet with the adjustment sheet unfolded, in which the punch hole is formed; and a position identifying unit that identifies a position of a fold line using at least positions of a pair of punch hole images which appear in the image of the adjustment sheet and on both sides of the fold line of the adjustment sheet.

14 Claims, 12 Drawing Sheets

SELECTION OF ADJUSTMENT ITEM
  PLEASE SELECT ADJUSTMENT ITEM.

| ALIGNMENT ADJUSTMENT |
| TRANSFER VOLTAGE ADJUSTMENT |
| FINISHER ADJUSTMENT |

FIG. 5B

FOLD POSITION ADJUSTMENT
(SELECTION OF FOLD PATTERN)
  PLEASE SELECT FOLD PATTERN TO BE ADJUSTED.

| HALF FOLD |
| INNER TRIPLE FOLD |
| Z FOLD |
| CREASING |
⋮

FIG. 5C

POSITION ADJUSTMENT
(SELECTION OF PAPER)
  PLEASE SELECT PAPER TO BE ADJUSTED.

| TRAY 1: PLAIN PAPER |
| TRAY 2: HEAVY PAPER |
| TRAY 3: COATED PAPER |
| TRAY 4: THIN PAPER |
⋮

(START TO GENERATE ADJUSTMENT SHEET)

IMAGE PROCESSING DEVICE AND METHOD

CROSS-REFERENCE TO RELATED APPLICATIONS

This application is based on and claims priority under 35 USC 119 from Japanese Patent Application No. 2017-200739 filed on Oct. 17, 2017.

BACKGROUND

Technical Field

The present invention relates to an image processing device and a method.

SUMMARY

According to an aspect of the invention, there is provided an image processing device including: a fold unit that folds an adjustment sheet based on a predetermined reference fold position; a punch hole former that forms a punch hole in a stacked portion of the adjustment sheet, created as a consequence of folding of the adjustment sheet; an image reader that reads an image of the adjustment sheet with the adjustment sheet unfolded, in which the punch hole is formed; and a position identifying unit that identifies a position of a fold line using at least positions of a pair of punch hole images which appear in the image of the adjustment sheet and on both sides of the fold line of the adjustment sheet.

BRIEF DESCRIPTION OF THE DRAWINGS

Exemplary embodiment of the present invention will be described in detail based on the following figures, wherein.

DETAILED DESCRIPTION

Hereinafter, an exemplary embodiment of the invention will be described with reference to the drawings.

Figure 1:
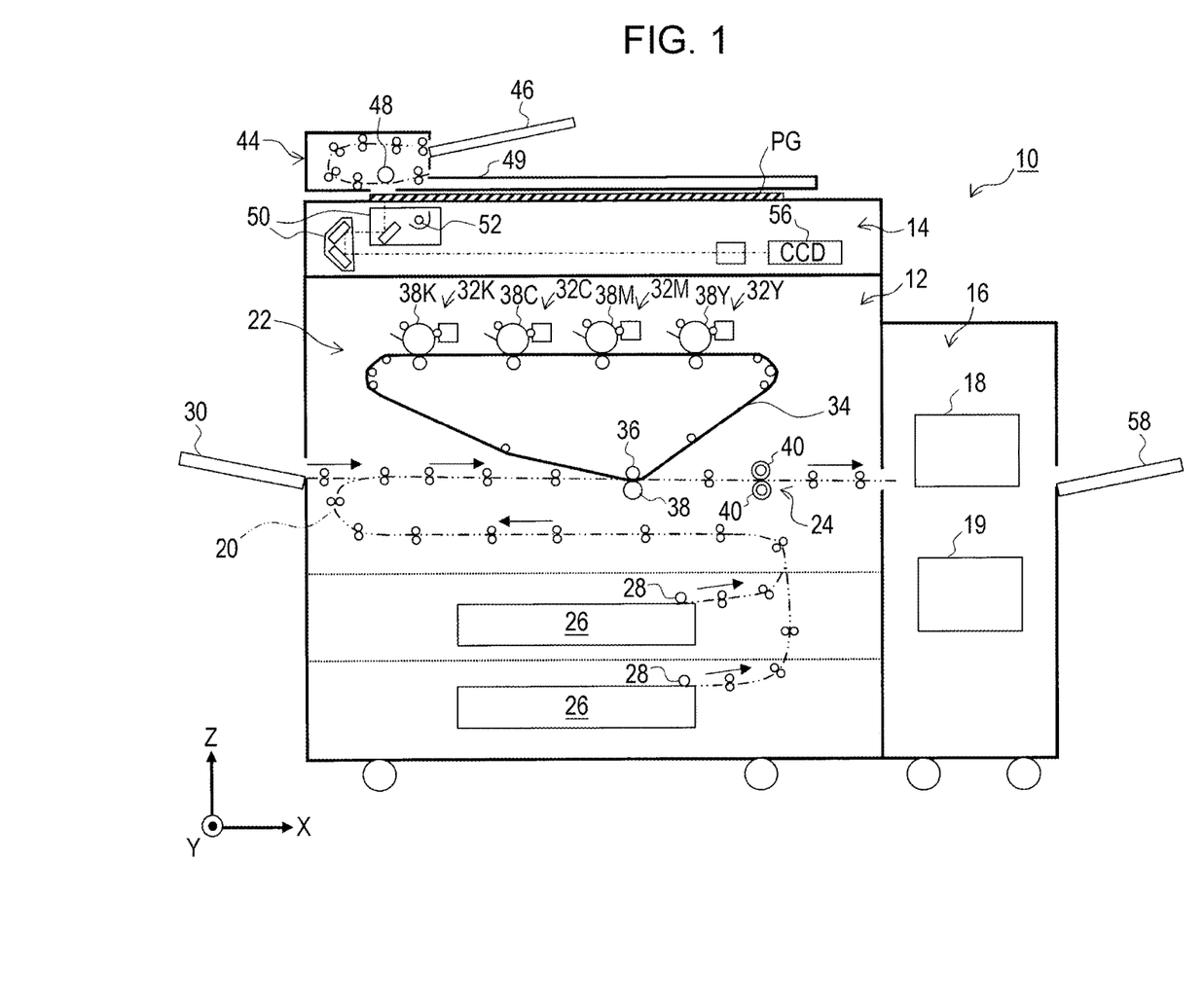
FIG. 1 is a schematic configuration diagram of an image processing device.

FIG. 1 is a schematic configuration diagram of an image processing device. An image processing device 10 includes an image former 12 that forms an image on recording paper, an image reader 14 which is an image scanner that reads the image of a document, and a post processor 16 which is a finisher that performs fold processing and punch hole formation processing on the recording paper.

The image processing device 10 in the exemplary embodiment is, for instance, a copy machine that has a copy function of forming an image of a document on the recording paper by the image former 12, the document being read by the image reader 14. Also, the image processing device 10 in the exemplary embodiment is connected to, for instance, a personal computer (hereinafter referred to as a PC) via a network, and performs printing by the image former 12 based on image data inputted as a print job from a PC. The image processing device 10 receives an instruction for fold processing to be performed on the recording paper from a user interface (hereinafter referred to as a UI) provided in the device body or a PC, and a fold unit 18 of the post processor 16 performs fold processing on the recording paper. The image processing device 10 receives an instruction for punch hole formation processing to be performed on the recording paper from a UI or a PC provided in the device body, and a punch hole former 19 of the post processor 16 performs the punch hole formation processing on the recording paper. As described below, the image processing device 10 adjusts the fold position of the recording paper by the fold unit 18. It is to be noted that in the present description, the "recording paper" is not limited to a sheet (medium) on which an image is formed, and includes a sheet on which an image is not formed.

The image former 12 includes a transport path 20 for transporting the recording paper, a toner image former 22 that forms a toner image on the recording paper, and a fixing unit 24 that fixes a toner image on the recording paper. Also, the image processing device 10 includes multiple sheet trays 26 in which sheets of recording paper are to be stored. Although FIG. 1 illustrates two sheet trays 26, actually more than two sheet trays 26 are provided. In each of the sheet trays 26, sheets of recording paper are stored according to a type (such as a kind, and size) of the recording paper, for instance.

The uppermost sheet of recording paper among multiple sheets of recording paper stored in the sheet trays 26 is to be delivered to the transport path 20 by a delivery roller 28. The transport path 20 has one end connected to each sheet tray 26 and the other end connected to a transport path (not illustrated) of the post processor 16 through the toner image former 22. Thus, the recording paper delivered from the sheet trays 26 to the transport path 20 is transported to the toner image former 22, and subsequently, is transported to the post processor 16 through the fixing unit 24.

As illustrated in FIG. 1, the image processing device 10 includes a bypass tray 30. The recording paper placed on the bypass tray 30 is also delivered to the transport path 20, and is transported to the toner image former 22, and subsequently, is transported to the post processor 16 through the fixing unit 24.

The toner image former 22 includes developing units 32Y, 32M, 32C, and 32K having respective colors of yellow (Y), magenta (M), cyan (C), and black (K), and an endless transfer belt 34 as an intermediate retention body. The transfer belt 34 is wound around multiple rollers including the transfer roller 36 near the transport path 20, and is rotationally driven. Also, the transfer belt 34 is in contact with photoconductor drums 38Y, 38M, 38C, and 38K which are provided in the developing units 32Y, 32M, 32C, and 32K.

The toner image former 22 is to receive input of image signals (raster data) having respective colors of Y, M, C, and K generated based on image data. The toner image former 22 forms toner images in colors of Y, M, C, and K in the respective photoconductor drums 38Y, 38M, 38C, and 38K of the developing units 32Y, 32M, 32C, and 32K based on the image signals, and the toner images are superimposed on the transfer belt 34 and transferred.

In the toner image former 22, a roller 38 (bias transfer roller) is provided to be opposed to the transfer roller 36, and the recording paper is delivered between the transfer roller 36 and the roller 38, and is sandwiched between the transfer roller 36 and the roller 38 along with the transfer belt 34. Consequently, the recording paper is delivered while toner images of the transfer belt 34 are being transferred to the recording paper.

The fixing unit 24 includes a pair of fixing rollers 40, and the recording paper on which toner images have been transferred is delivered between the fixing rollers 40. The fixing unit 24 sandwiches the recording paper, which is delivered between the fixing rollers 40, between the fixing rollers 40, heats the recording paper while pressurizing the recording paper, and delivers the recording paper on which toner images are fixed. Consequently, an image according to the image data is formed on the recording paper.

A general configuration using an electrophotographic system may be applied to the image former 12 described above, and a detailed description is omitted.

The image processing device 10 includes an automatic document transporter 44. The automatic document transporter 44 is supported on a platen glass PG (hereinafter simply referred to as a platen PG for the sake of convenience) which is a document base. It is to be noted that the platen PG configurates part of the image reader 14 (image scanner). The automatic document transporter 44 has a document sheet supply tray 46 in which multiple documents having an image to be read are placed in the stack. Each of multiple documents placed in the document paper supply tray 46 is sequentially passed through a copy position on the platen PG, in other words, a pressure-contact position of a platen roller 48 of the document transporter 44, and is discharged to a document paper output tray 49. The automatic document transporter 44 is rotatable with respect to the platen PG upper surface around a rotation shaft (not illustrated) provided at the rear end, which extends in a crosswise direction (the X-axis direction of FIG. 1). When a user or the like places a document on the platen PG by a hand, the automatic document transporter 44 is rotated upward.

The image reader 14 (image scanner) includes the platen PG, and an exposure optical system 50 that is disposed below the platen PG and reads a document image. The exposure optical system 50 includes a light source 52 and multiple mirrors. A document transported to the platen PG upper surface and passed through a copy position by the automatic document transporter 44 or a document manually placed on the platen PG is irradiated with light from the light source 52, and a reflection light from the document is passed through the exposure optical system 50 and converted to an electrical signal by a solid-state imaging charge coupled device (CCD) 56. It is to be noted that when an image of a manually placed document on the platen PG is read, the exposure optical system 50 moves in the X-axis direction of FIG. 1, and scans the document.

A general configuration of, for instance, a CCD image scanner may be applied to the image reader 14 described above, and a detailed description is omitted.

The finisher serving as the post processor 16 includes the fold unit 18 that performs fold processing on the recording paper transported from the image former 12, a punch hole former 19 that performs punch hole formation processing on the recording paper, and a discharge tray 58. The fold unit 18 folds the recording paper by a set folding method such as half fold, inner triple fold, and Z fold. Also, the punch hole former 19 forms one or more punch holes in a recording paper. A recording paper, on which processing has been performed by the fold unit 18 or the punch hole former 19, is discharged to the discharge tray 58. It is to be noted that the post processor 16 may include a booklet creator (not illustrated) that creates a booklet by stacking multiple sheets of recording paper, saddle stitching the stacked sheets of recording paper, and half-folding the sheets of recording paper, and a stapler (not illustrated) that stacks multiple sheets of recording paper, and staples the stacked sheets of recording paper at a predetermined position of the peripheral edge. A publicly known configuration in related art may be applied to the fold unit 18, the punch hole former 19, the booklet creator, and the stapler.

Figure 2A:
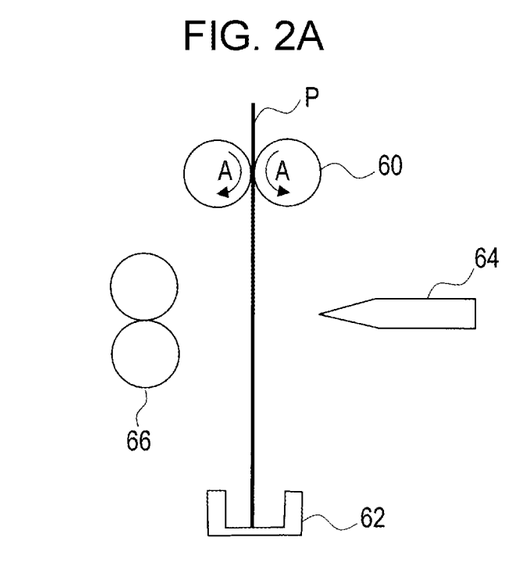
FIGS. 2A and 2B are schematic views of an example of the mechanism of a fold unit.
Figure 2B:
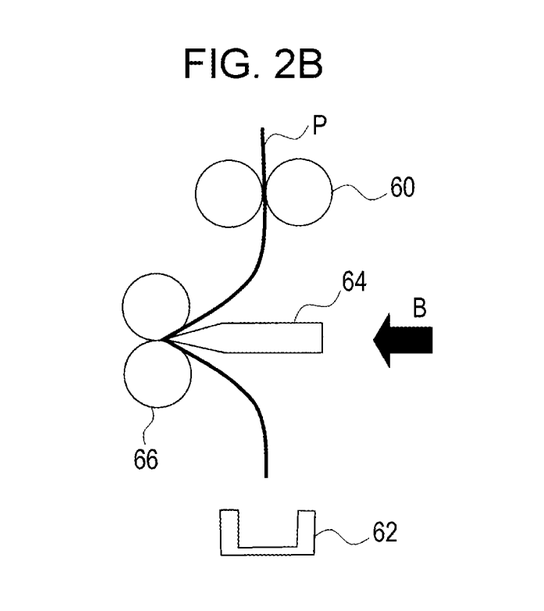

FIGS. 2A and 2B are schematic views of an example of folding mechanism of the fold unit 18.

As illustrated in FIG. 2A, recording paper P is transported by a pair of transport rollers 60 which are rotated in the direction of an arrow A, and is bumped against a gate 62. When the recording paper P is bumped against the gate 62, transportation is stopped. When the transportation is stopped, as illustrated in FIG. 2B, a knife-shaped folding member 64 moves to a pair of folding rollers 66 in the direction of an arrow B, and pushes the recording paper P into the pair of folding rollers 66. Consequently, the recording paper P is folded by the pair of folding rollers 66.

The fold position of the recording paper P depends on, for instance, the amount of deflection of the recording paper P pushed out from the pair of transport rollers 60. The recording paper P may be deflected depending on paper characteristics (such as the thickness, and the degree of elasticity of recording paper P), and the amount of deflection may vary. Thus, the fold position has to be adjusted according to the paper characteristics of the recording paper P. It is to be noted that the fold position of the recording paper P may vary due to a factor other than the "amount of deflection" mentioned above.

Figure 3:
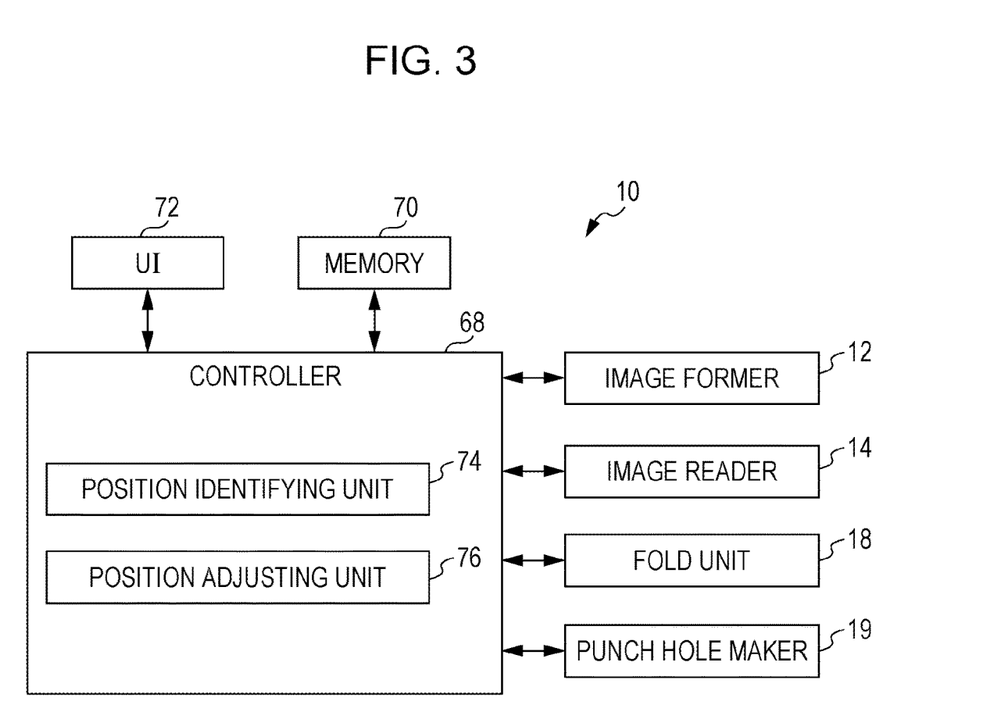
FIG. 3 is a diagram illustrating a control configuration of fold position adjustment processing of the image processing device.

FIG. 3 is a block diagram illustrating the control configuration of fold position adjustment processing of the image processing device 10 in the exemplary embodiment. The image processing device 10 includes a controller 68, a memory 70, and a user interface (UI) 72. The controller 68 includes a processor such as a CPU, and executes processing in accordance with a program stored in the memory 70. Thus, the controller 68 functions as the later-described position identifying unit 74, and position adjusting unit 76. The memory 70 is a ROM, a RAM, or a flash memory or the like, and stores a program executed by the controller 68, and an adjustment value, temporary data determined by the fold position adjustment processing. The UI 72 displays a setting screen in the fold position adjustment processing, and receives an operation from a user or a serviceman or the like (hereinafter referred to as a user). The controller 68 is connected to the image former 12, the image reader 14, the fold unit 18, and the punch hole former 19, and can control each of these components.

Figure 4:
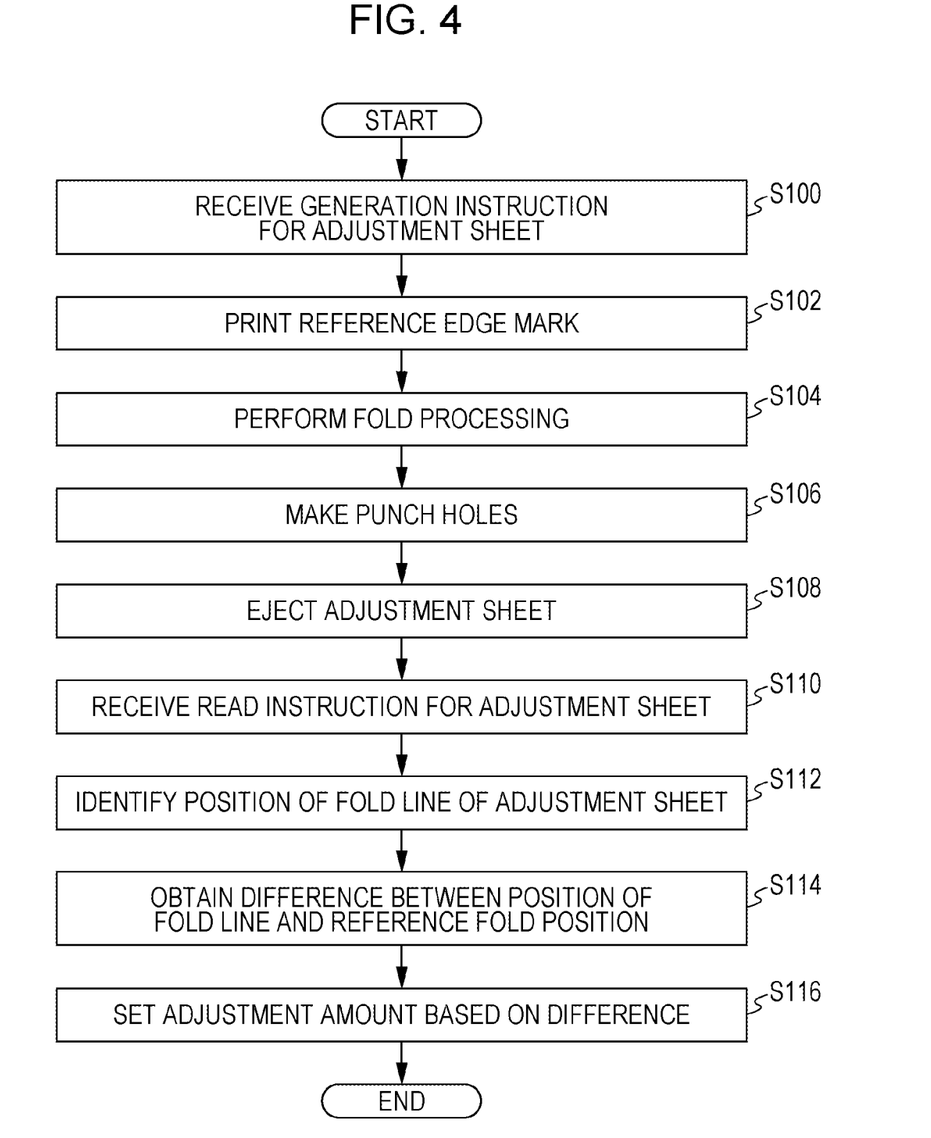
FIG. 4 is a flowchart illustrating the flow of the fold position adjustment processing of the image processing device.

FIG. 4 is a flowchart illustrating the flow of the fold position adjustment processing of the image processing device 10. In the exemplary embodiment, the fold position adjustment processing is performed by executing the flow of FIG. 4 for each of the types of recording paper and for each of the fold patterns of recording paper.

Figure 5A:
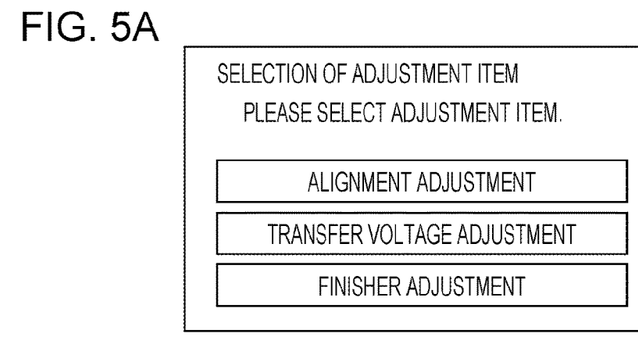
FIGS. 5A to 5C are screens illustrating an example of a setting screen for the fold position adjustment processing.
Figure 5B:
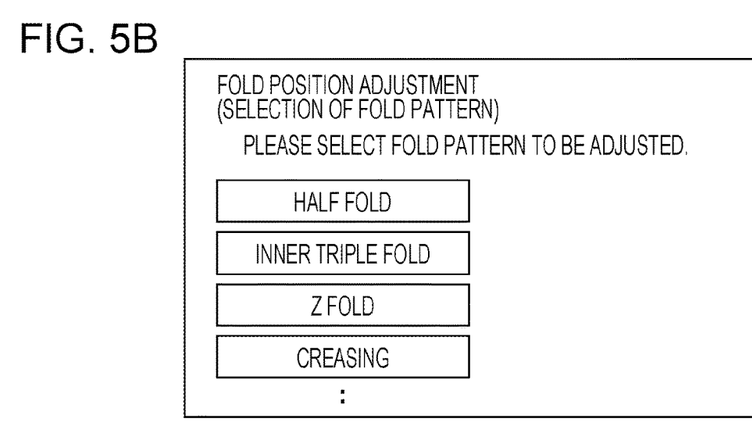
Figure 5C:
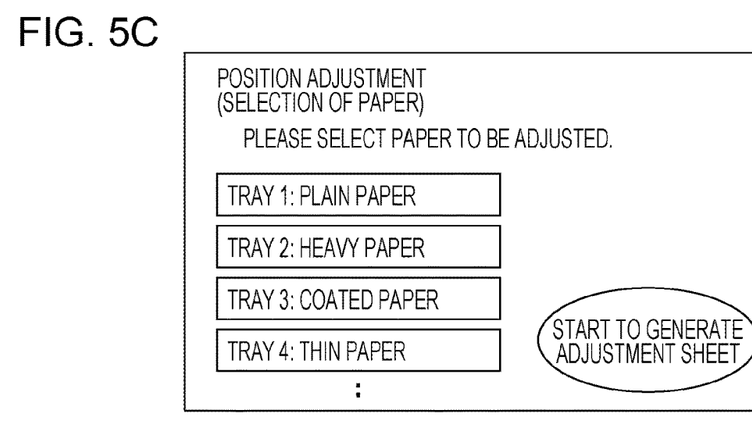

First, in S100, the controller 68 receives a generation instruction for an adjustment sheet via the UI 72. FIGS. 5A to 5C are each an example of a setting screen of the fold position adjustment processing and an adjustment sheet generation instruction receiving screen displayed on the UI 72. First, a selection screen for adjustment item illustrated in FIG. 5A is displayed, and "finisher adjustment" is selected by a user, for instance. Next, a selection screen for fold pattern illustrated in FIG. 5B is displayed, and a fold pattern to be adjusted is selected by a user. Next, a selection screen for recording paper (paper) illustrated in FIG. 5C is displayed, and recording paper to be adjusted is selected by a user. Although only the types of paper are illustrated and paper sizes are not illustrated in FIG. 5C, a paper size (for instance, A3, A4, or B5) may be selected in addition to a type of paper.

When the "start to generate adjustment sheet" button illustrated in FIG. 5C is touched, a generation instruction for an adjustment sheet is received. When a generation instruction for an adjustment sheet is received, the controller 68 controls the image former 12, supplies the recording paper from the paper tray 26 which stores the recording paper (paper) selected in FIG. 5C, and delivers the recording paper to the transport path 20. It is also possible for a user to place the recording paper selected in FIG. 5C in the bypass tray 30, and to supply the recording paper from the bypass tray 30 by touching the "start to generate adjustment sheet" button, and to deliver the recording paper to the transport path 20. The supplied recording paper serves as an adjustment sheet.

Figure 6:
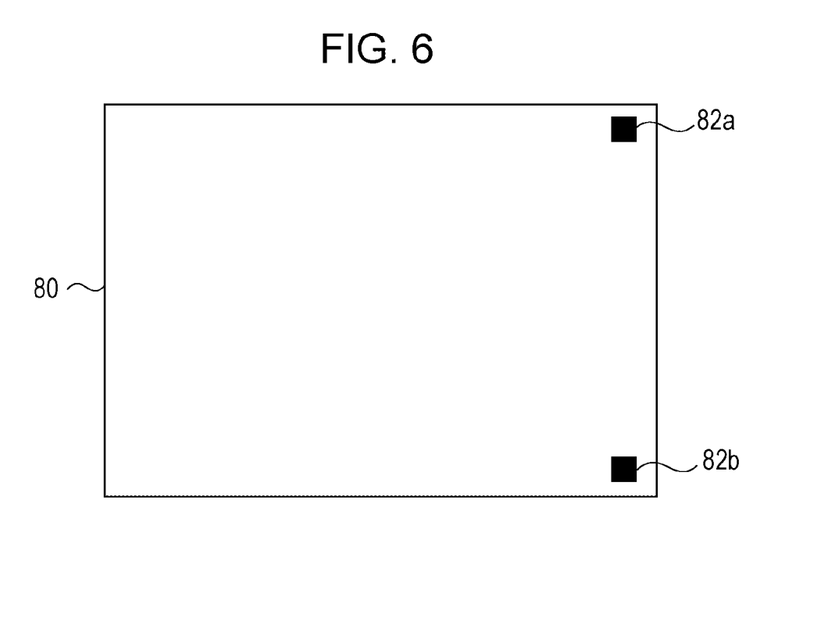
FIG. 6 is a view illustrating an example of an adjustment sheet on which reference edge marks are printed.

Next, in S102 of FIG. 4, the controller 68 controls the image former 12 so that a reference edge mark is printed on the recording paper (adjustment sheet) supplied from the paper tray 26 or the bypass tray 30. FIG. 6 is a view illustrating an example of an adjustment sheet 80 on which a reference edge mark 82a and a reference edge mark 82b are printed. As described later, the two reference edge marks 82a, 82b indicate reference edges of the adjustment sheet 80, and are respectively printed at the upper right corner and the lower right corner the adjustment sheet 80 in the exemplary embodiment. The reference edge marks 82a, 82b are is printed with only the toner of K color, for instance.

In S102 of FIG. 4, after the reference edge marks printed on the adjustment sheet, the adjustment sheet is delivered to the post processor 16.

Figure 7:
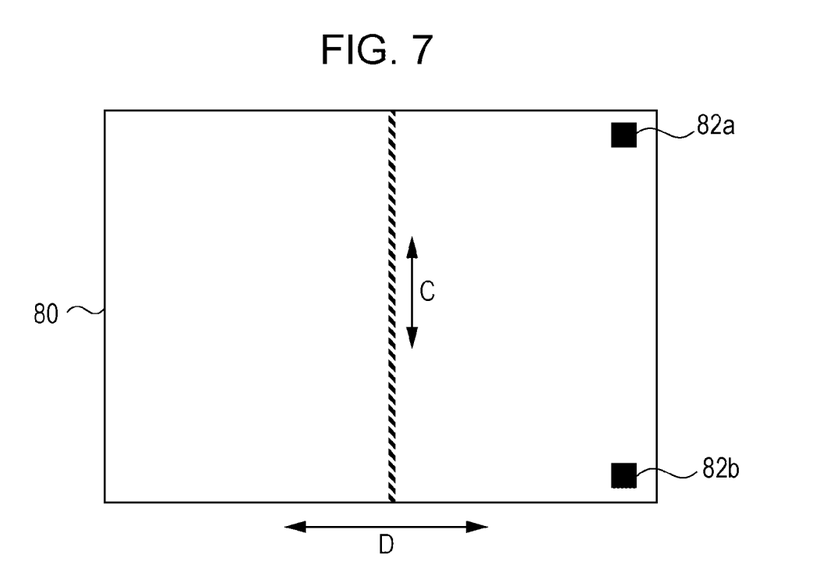
FIG. 7 is a view illustrating a state where a half folded adjustment sheet is unfolded.

In S104, the controller 68 controls the fold unit 18 so that fold processing is performed on the adjustment sheet. The fold processing is performed using a fold pattern selected in FIG. 5B. FIG. 7 is a view illustrating a state where "half fold" is selected in FIG. 5B, and the adjustment sheet 80, on which half fold processing has been performed, is unfolded. As described later, the adjustment sheet 80, on which the fold processing has been performed, is not unfolded, and subsequently, punch holes are formed by the punch hole former 19. Thus, at this point (S104), the adjustment sheet 80 is not unfolded. However, for illustrative purposes, FIG. 7 illustrates a state where the adjustment sheet 80 is unfolded.

The fold position is illustrated by an oblique line in FIG. 7. The fold position of the adjustment sheet 80 is pre-stored as a reference fold position in the memory 70, for instance. In other words, the reference fold position is a predetermined fold position. Although the fold unit 18 performs fold processing on the adjustment sheet 80 in accordance with a reference fold position, an actual fold position may deviate from the reference fold position. It is to be noted that as illustrated in FIG. 7, the reference edge marks 82a, 82b indicate an edge as a reference in a direction (crossing direction) D crossing a direction C along the fold of the adjustment sheet 80.

Figure 8:
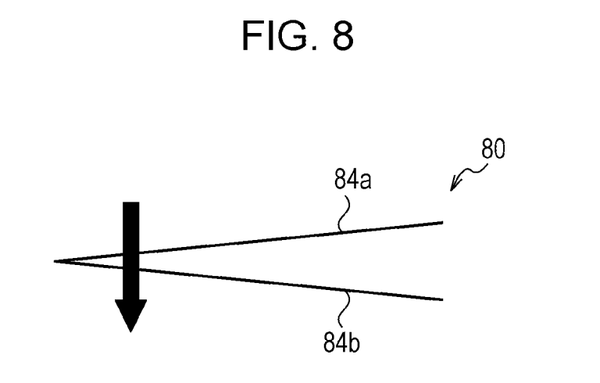
FIG. 8 is a view for explaining the manner in which punch holes are formed in a half folded adjustment sheet.

Next, in S106 of FIG. 4, the controller 68 controls the punch hole former 19, forms punch holes in a stacked portion of the adjustment sheet, created as a consequence of folding of the adjustment sheet by the fold unit 18. FIG. 8 is a view illustrating a state where punch holes are formed in a half folded adjustment sheet 80. Although FIG. 8 illustrates a state where space is provided between a first section 84a and a second section 84b of the half folded adjustment sheet 80 to make FIG. 8 easier to understand, the first section 84a and the second section 84b are in a state where both are actually in contact (stacked) with each other. In the exemplary embodiment, two punch holes are formed at the position of the thick line arrow of FIG. 8 of the half folded adjustment sheet 80.

Figure 9:
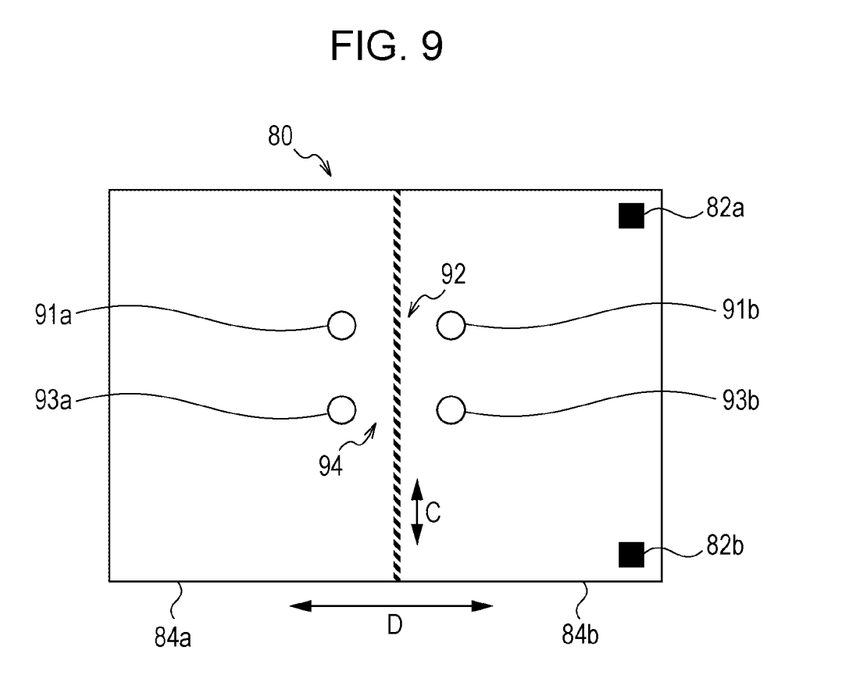
FIG. 9 is a view illustrating a state where an adjustment sheet, in which punch holes are formed, is unfolded.

FIG. 9 is a view illustrating a state where the adjustment sheet 80, in which the punch holes are formed, is unfolded. As illustrated in FIG. 9, when two punch holes are formed in the half folded adjustment sheet 80, the adjustment sheet 80 (in a state of unfolded) has four punch holes 91a, 91b, 93a, and 93b. In other words, when one punch hole is formed in the folded adjustment sheet 80, the adjustment sheet 80 has as many punch holes as the number of stacked sheets of paper. Since the fold pattern is "half fold" in the exemplary embodiment, the number of stacked sheets of paper is two (the first section 84a and the second section 84b), and when one punch hole is formed in a folded state, two punch holes are made. Two punch holes in an unfolded state corresponding to one punch hole in a folded state configurate a pair of punch holes. Specifically, in FIG. 9, two punch holes 91a, 91b configurate a pair of punch holes 92, two punch holes 93a, 93b configurate a pair of punch holes 94. As illustrated in FIG. 9, the two punch holes 91a, 91b (or 93a, 93b) which configurate a pair of punch holes 92 (or 94) are formed on both sided of a fold line (oblique line of FIG. 9).

Figure 10:
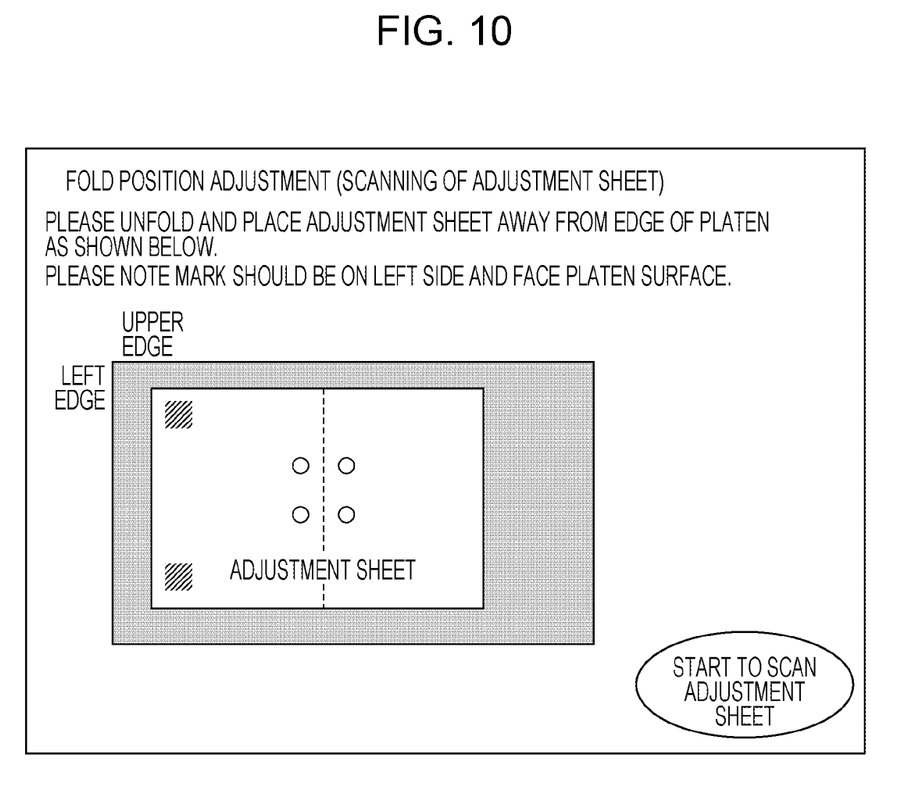
FIG. 10 is a screen illustrating an example of a guide screen when an adjustment sheet in the fold position adjustment processing is placed on a platen glass.

After punch holes are formed in the adjustment sheet in S106 of FIG. 4, in S108, the controller 68 discharges the folded adjustment sheet to the discharge tray 58. A user then unfolds the adjustment sheet (folded adjustment sheet) discharged from the discharge tray 58, and places the unfolded adjustment sheet on the platen glass PG. FIG. 10 is an example of a guide screen for placing the adjustment sheet displayed on the UI 72 on the platen PG. As illustrated in FIG. 10, the UI 72 displays guidance indicating that the adjustment sheet should be unfolded and placed away from the edge of the platen PG. Also, guidance is displayed, which indicates that the two reference edge marks (■ marks) printed on the adjustment sheet should be located on the left side, and the side of the adjustment sheet, on which the two reference edge marks are printed, should face the platen PG surface. A user unfolds and places the adjustment sheet on the platen PG in accordance with the guidance.

Next, in S110 of FIG. 4, the controller 68 receives a read instruction for adjustment sheet via the UI 72. Specifically, when the "start to scan adjustment sheet" button illustrated in FIG. 10 is touched, a read instruction for adjustment sheet is received. The controller 68 controls the image reader 14 so that an image on the adjustment sheet is read. Specifically, the exposure optical system 50 of the image reader 14 moves to scan the adjustment sheet, thereby reading an image on the adjustment sheet. It is to be noted that the exposure optical system 50 corresponds to a scanner. In this manner, the image reader 14 reads the image of the adjustment sheet with the adjustment sheet folded.

Figure 11:
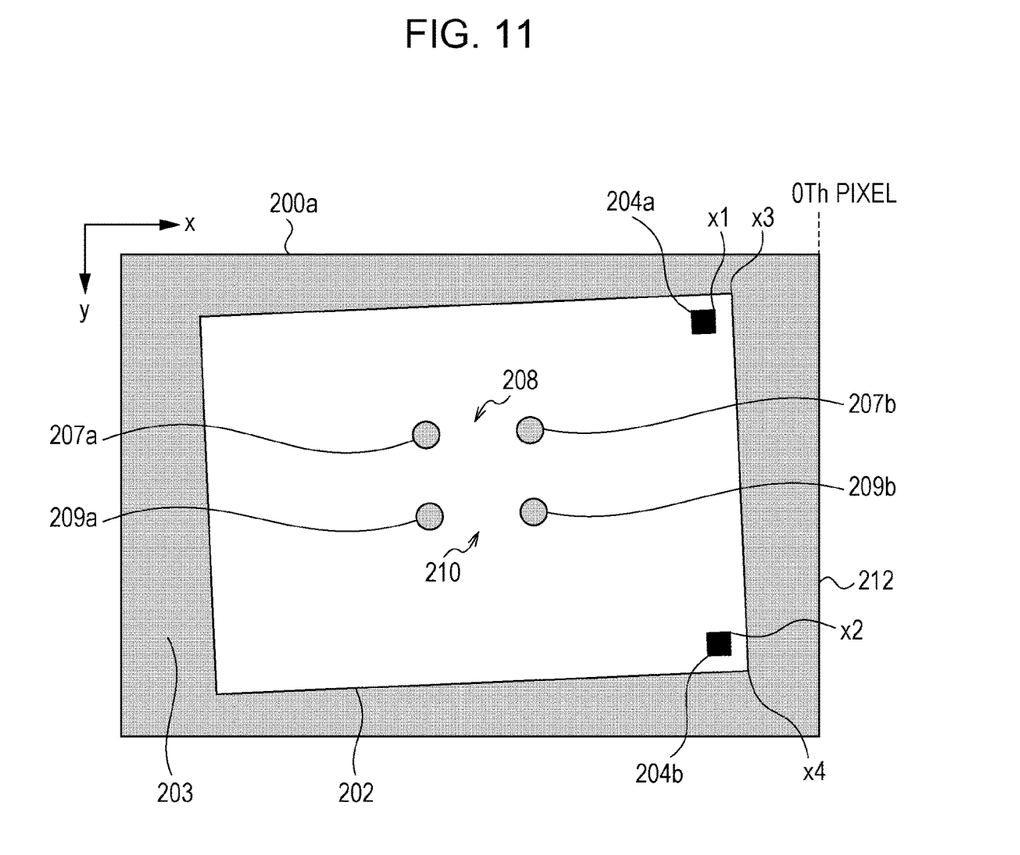
FIG. 11 is a view illustrating an example of an image of an adjustment sheet which has been read.

Next, in S112 of FIG. 4, the controller 68 functions as the position identifying unit 74, and identifies the position of the fold line of the adjustment sheet using punch hole images which appear in the image of the adjustment sheet. FIG. 11 illustrates an example of a read image 200a of the adjustment sheet. When the read image of the adjustment sheet is a color image, the image may be converted from a color image into a monochrome image by a publicly known method in related art. FIG. 11 illustrates an image after the conversion. As illustrated in FIG. 11, the image 200a of the adjustment sheet has an adjustment sheet section 202 (white section of FIG. 11), and an outer-side section 203 (gray section of FIG. 11) of the adjustment sheet section 202. The images (punch hole images) 207a, 207b, 209a, and 209b of punch holes of the adjustment sheet, and the images (reference edge mark images) 204a, 204b of two reference edge marks of the adjustment sheet appear on the adjustment sheet section 202. It is to be noted that the two punch hole images 207a, 207b configurate a pair of punch hole images 208, and the two punch hole images 209a and 209b configurate a pair of punch hole images 210.

When the adjustment sheet is placed on the platen PG in an inclined manner, as illustrated in FIG. 11, the adjustment sheet section 202 is inclined. In this case, the fold line position of the adjustment sheet may not be identified accurately using the punch hole images. Thus, skew adjustment may be performed as described below. In FIG. 11, the crosswise direction is the x-axis direction, and the vertical direction is the y-axis direction. The same goes with in FIGS. 12, 13 which will be described below. Skew adjustment is performed in such a manner that respective pixel positions x1, x2 (the pixel positions in the x-axis direction where the right edge 212 of the image is defined as the 0th pixel, hereinafter are the same as the "pixel positions" mentioned in the description of FIG. 11) of the upper right corners of the two reference edge mark images 204a, 204b are detected for instance, the difference Δx12 (=x1−x2) between x1 and x2 is determined, and the adjustment sheet section 202 is rotated according to the Δx12. Alternatively, the skew adjustment is performed in such a manner that the pixel position x3 of the upper right corner of the adjustment sheet section 202, and the pixel position x4 of the lower right corner of the adjustment sheet section 202 are detected for instance, the difference Δx34 (=x3−x4) between x3 and x4 is determined, and the adjustment sheet section 202 is rotated according to the Δx34. It is to be noted that the above-mentioned detection of a pixel position can be made by a technique in related art, such as edge detection or pattern matching.

Figure 12:
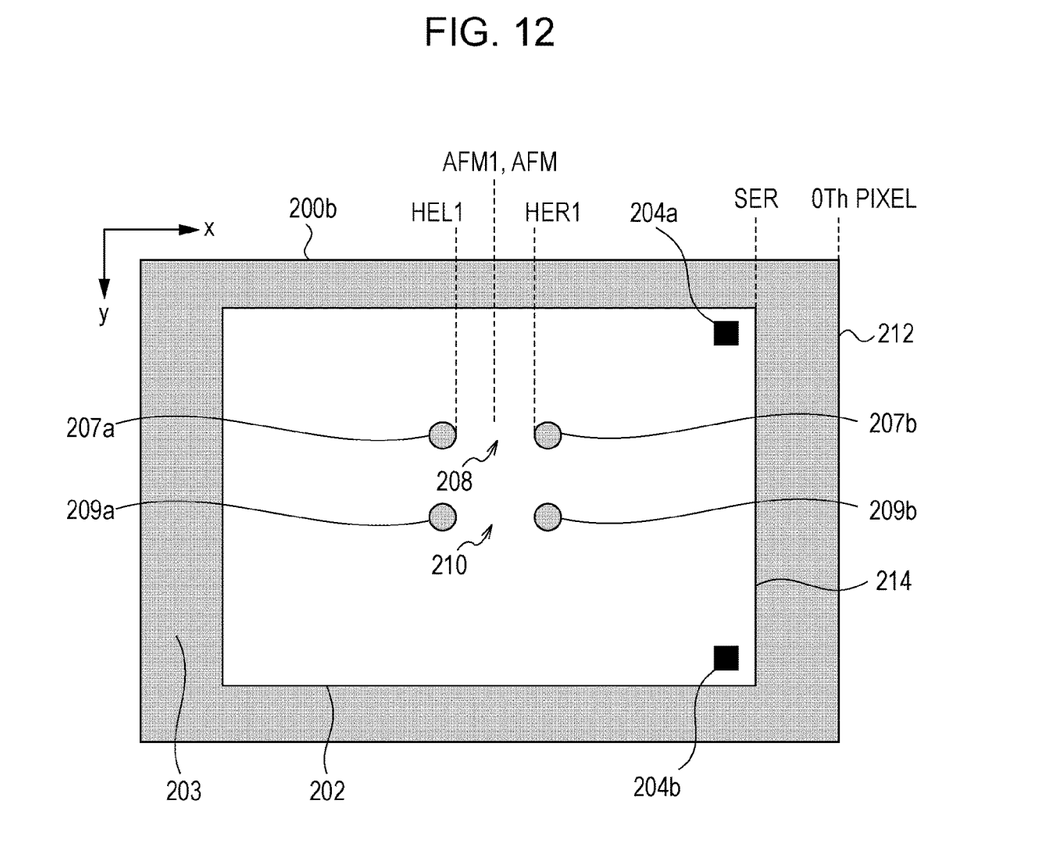
FIG. 12 is a view illustrating an example of an image of an adjustment sheet after skew adjustment.

FIG. 12 is a view illustrating an example of an image 200b of the adjustment sheet after skew adjustment. A method of identifying the position of a fold line of the adjustment sheet will be described with reference to FIG. 12. As illustrated in FIG. 12, two pairs of punch hole images 208, 210 are present in the image 200b of the adjustment sheet. In short, multiple pairs of punch hole images are present. First, respective pixel positions HEL1, HER1, in the x-axis direction, of two punch hole images 207a, 207b included in a pair of punch hole images 208 are detected. The pixel position here indicates a pixel position in the x-axis direction, where the end of the image (the right end 212 of the image) on the side (right side), on which the reference edge mark images 204a, 204b are present, is defined as the 0th pixel. In the exemplary embodiment, the position of the inner end of each of the punch hole images 207a, 207b is detected as the position of a corresponding one of the two punch hole images 207a, 207b. The inner end indicates an end of the area of one punch hole image, the end being closest to the other punch hole image. The detection of HEL1, HER1 can be made by a technique in related art, such as edge detection or pattern matching. Next, a central position AFM1 is determined, which is equidistant from the pixel positions HEL1, HER1 of the two punch hole images 207a, 207b included in the pair of punch hole images 208. The position of the fold line is accurately identified by determining the central position in this manner.

Next, similarly to what has been described above, the pixel positions HEL2, HER2 (not illustrated) of the two punch hole images 209a, 209b included in the other pair of punch hole images 210 are detected, and a central position AFM2 (not illustrated) is determined, which is equidistant from the pixel positions HEL2, HER2. Then a final central position AFM is determined from the two central positions AFM1 and AFM2. Specifically, for instance, the average value of the central positions AFM1, AFM2 is determined as the final central position AFM. The central position AFM is a pixel position in the x-axis direction, where the right end 212 of the image is defined as the 0th pixel.

Figure 13:
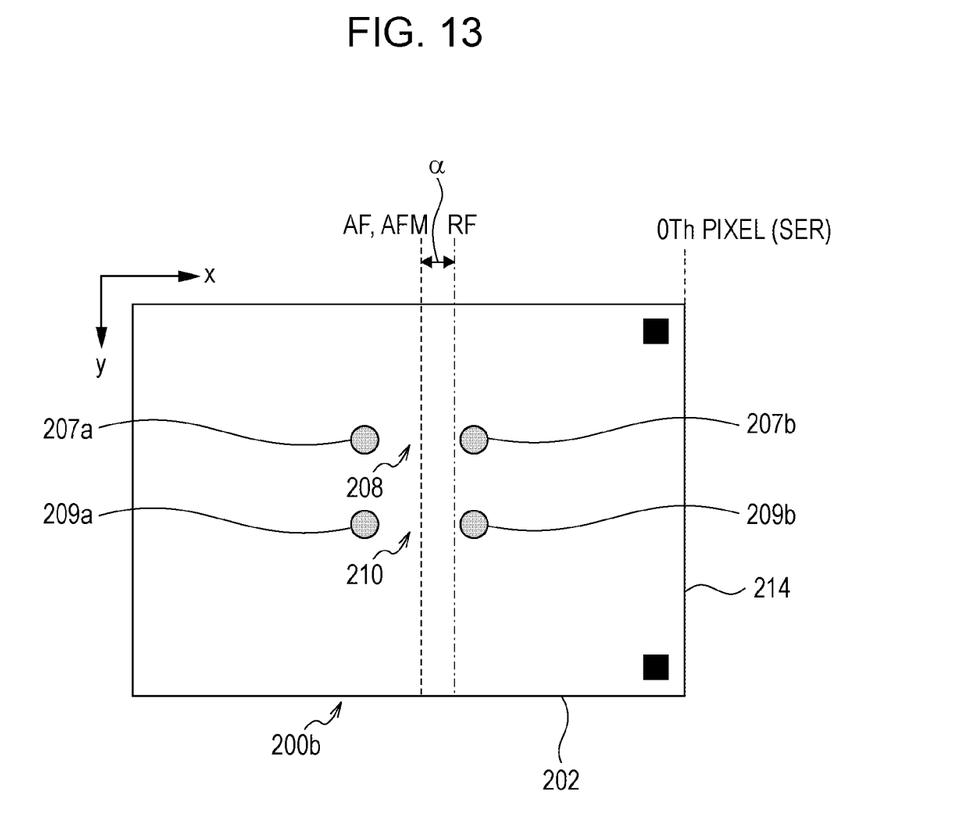
FIG. 13 is a view for explaining the difference between the position of a fold line and a reference fold position.

Next, the position of the pixel position AFM is calculated when an edge of the adjustment sheet section 202 (right end 214 of the adjustment sheet section) on the side (right side), on which the reference edge mark images 204a, 204b are present, is defined as the 0th pixel in the x-axis direction. It is to be noted that hereinafter the right end 214 of the adjustment sheet section is also referred to as a reference edge 214. In order to calculate this, first a pixel position SER (pixel position in the x-axis direction) of the reference edge 214 when the right end 212 of the image illustrated in FIG. 12 is defined as the 0th pixel is detected. The pixel position SER is then subtracted from the pixel position AFM, thus the pixel position AFM (pixel position AF) when the pixel position SER is defined as the 0th pixel can be calculated. FIG. 13 illustrates the pixel position AF. The pixel position AF is the identified position of the fold line.

Returning to FIG. 4, description of the flow of the adjustment processing is continued. In S114 subsequent to S112, the controller 68 obtains the difference between the position of the fold line and the reference fold position. The memory 70 stores the pixel position RF of the reference fold position with respect to the reference edge 214. FIG. 13 illustrates an example of the pixel position RF of the reference fold position. The controller 68 calculates the differential number α of pixels between the pixel position AF of the position of the fold line and the pixel position RF of the reference fold position. The product of the differential number α of pixels and a distance D (mm) per pixel corresponds to the displacement amount of the fold position.

Next, in S116 of FIG. 4, the controller 68 functions as the position adjusting unit 76, and sets an adjustment amount for the position of the fold line based on the differential number α of pixels between the pixel position AF of the position of the fold line and the pixel position RF of the reference fold position. The memory 70 pre-stores the distance D (mm) per pixel. As illustrated in FIG. 13, when the position AF of the identified fold line is on the left side of the reference fold position RF which is expected be the position of the fold line (when the differential number α of pixels is a positive value), an amount adjustments is set so that the position of the fold line is moved to the right side (closer to the reference edge 214) and matches the reference fold position RF. On the other hand, when the position AF of the identified fold line is on the right side of the reference fold position RF which is expected be the position of the fold line (when the differential number α of pixels is a negative value), an amount adjustments is set so that the position of the fold line is moved to the left side (away from the reference edge 214) and matches the reference fold position RF. The absolute value of the adjustment amount is the product of the differential number α of pixels and the distance D per pixel. The calculated adjustment amount stored in the memory 70 in association with the type of paper and the fold pattern (set in FIGS. 5B and 5C). The adjustment amount is used when a user issues an instruction for fold processing on the recording paper via the UI 72 or the PC in a normal time.

The above-described flow of FIG. 4 is performed for each type of paper and for each fold pattern, and an adjustment amount corresponding to the type and fold pattern is stored in the memory 70. When a user issues an instruction for fold processing on the recording paper via the UI 72 or the PC, an adjustment amount corresponding to the set type of paper and fold pattern is read from the memory 70, and the fold position of the fold unit 18 is adjusted by the adjustment amount. In this manner, the controller 68 (the position adjusting unit 76) adjusts the fold position of the fold unit 18 based on the difference between the position of the identified fold line of the adjustment sheet and the reference fold position. It is to be noted that adjustment of the fold position is made, for instance, by adjusting the gate 62 of the folding mechanism illustrated in FIGS. 2A and 2B.

With the image processing device 10 in the exemplary embodiment described above, the position of a fold line can be accurately identified by using the positions of punch hole images which appear on both sides of the fold line. Consequently, fold position adjustment can be made accurately and easily. Although identification of the position of a fold line in the fold position adjustment has been described above, the method of identifying the position of a fold line in the exemplary embodiment may also be utilized when the position of a fold line is desirably identified in another application.

The image processing device 10 in the exemplary embodiment described above identifies the position of a fold line using the two pairs of punch hole images 208, 210. However, the image processing device 10 may identify the position of a fold line using a pair of punch hole images 208 only. In that case, the central position AFM1 described above is the final central position AFM. Alternatively, the position of a fold line may be identified using three or more pairs of punch hole images. When the position of a fold line is identified using multiple pairs of punch hole images in this manner, for instance, even in a situation where predetermined pairs of punch hole images do not prominently appear on the image of the adjustment sheet, it is possible to identify the position of a fold line.

To identify the position of a fold line, the image processing device 10 in the exemplary embodiment described above defines the position of each of two punch hole images 207a, 207b included in a pair of punch hole images as the position of the inner end of a corresponding one of the punch hole images 207a, 207b. Thus, the position of a fold line can be easily identified. Alternatively, the position of each of two punch hole images 207a, 207b included in the pair of punch hole images may be defined as the position of the outer end of a corresponding one of the punch hole images 207a, 207b, or as the central position of the punch hole images 207a, 207b. The outer end indicates an end of the area of one punch hole image, the end being opposed to an end closer to the other punch hole image.

A description has been given above using "half fold" as an example. However, needless to say, the fold pattern may be "Z fold", "inner triple fold", or "bellows fold". Here, an example of adjusting "Z fold" will be briefly described.

Figure 14:
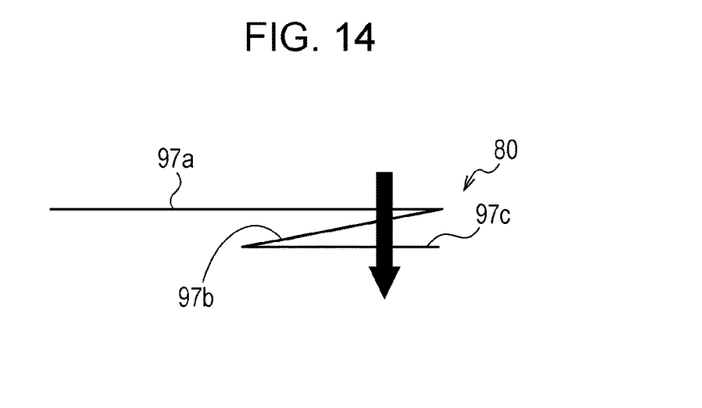
FIG. 14 is a view for explaining the manner in which punch holes are formed in an adjustment sheet in fold position adjustment for Z fold.

FIG. 14 is a view illustrating a state where punch holes are formed in the adjustment sheet 80 which is Z folded. Although space is provided between a first section 97a, a second section 97b, and a third section 97c of the Z-folded adjustment sheet 80 to make FIG. 14 easier to understand, the first section 97a, the second section 97b, and the third section 97c are in a state where contiguous sections are actually in contact (stacked) with each other. Two punch holes are formed at the position of the thick line arrow of FIG. 14 of the Z-folded adjustment sheet 80.

Figure 15:
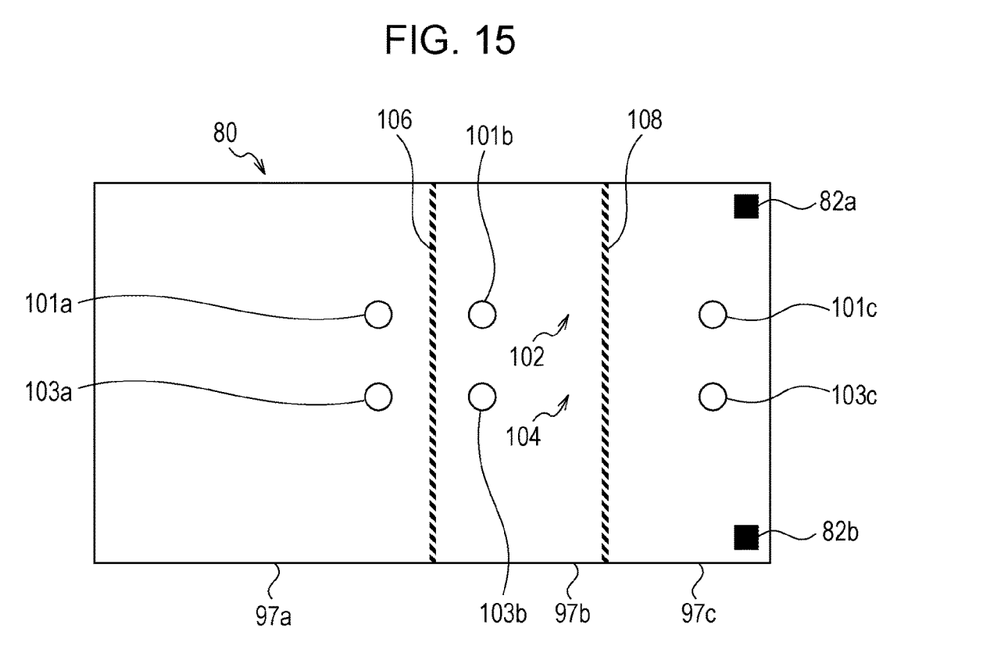
FIG. 15 is a view illustrating a state where an adjustment sheet, in which punch holes are formed in fold position adjustment for Z fold, is unfolded.

FIG. 15 is a view illustrating a state where the adjustment sheet 80 in which punch hole are formed is unfolded. The number of stacked sheets of paper is three (the first section 97a, the second section 97b, and the third section 97c) because of "Z fold", and when one punch hole is formed in a folded state, three punch holes are made. In other words, in FIG. 15, three punch holes 101a, 101b, and 101c configurate a pair of punch holes 102, and three punch holes 103a, 103b, and 103c configurate a pair of punch holes 104. As illustrated in FIG. 15, two punch holes 101a, 101b (or 103a, 103b) of a pair of punch holes 102 (or 104) are formed on both sides of a fold line 106, and two punch holes 101b, 101c (or 103b, 103c) of a pair of punch holes 102 (or 104) are formed on both sides of a fold line 108.

An image on the adjustment sheet is read by the image reader 14 in a state where the adjustment sheet 80 is unfolded. When the position of the fold line 106 is identified, punch hole images corresponding to the two punch holes 101a, 101b (or 103a, 103b) are used, and when the position of the fold line 108 is identified, punch hole images corresponding to the two punch holes 101b, 101c (or 103b, 103c) are used. Like this, even for a fold pattern in which three or more sheets of paper are stacked, it is possible to identify the position of a fold line using the punch hole images.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing device comprising:
at least one processor configured to control a fold unit configured to control folding of an adjustment sheet along a fold line using a reference fold position;
a punch hole former configured to form a pair of punch holes in a stacked portion of the adjustment sheet, created by the folding of the adjustment sheet,
wherein one punch hole of the pair of punch holes is formed on one side of the fold line and another punch hole of the pair of punch holes is formed on another side of the fold line opposite to the one side of the fold line;
an image reader configured to read an image of the adjustment sheet in which the pair of punch holes has been formed, with the adjustment sheet unfolded; and
wherein the at least one processor is further configured to execute a position identifying unit configured to calculate an actual position of the fold line, after the fold line has been formed, using at least calculated actual positions of images of the pair of punch holes appearing in the read image of the adjustment sheet.

2. The image processing device according to claim 1, wherein the at least one processor is further configured to execute a position adjusting unit configured to control adjusting a fold position of the fold unit using a difference between the actual position of the fold line calculated by the position identifying unit, and the reference fold position.

3. The image processing device according to claim 1,
wherein the position identifying unit is configured to calculate a central position equidistant from the calculated actual positions of the images of the pair of punch holes as the position of the fold line.

4. The image processing device according to claim 2, wherein the position identifying unit is configured to calculate a central position equidistant from the calculated actual positions of the images of the pair of punch holes as the position of the fold line.

5. The image processing device according to claim 3, wherein the calculated actual positions of the images of the pair of punch holes are each an inner end of a corresponding one of the images of the pair of punch holes.

6. The image processing device according to claim 4, wherein the calculated actual positions of images of the pair of punch holes are each an inner end of a corresponding one of the images of the pair of punch holes.

7. The image processing device according to claim 1, wherein the punch hole former is configured to form a plurality of pairs of punch holes in the stacked portion of the adjustment sheet,
wherein, in each pair of the plurality of pairs of punch holes, a first punch hole is formed on the one side of the fold line and a second punch hole is formed on the another side of the fold line, and
wherein the position identifying unit configured to calculate the actual position of the fold line using calculated actual positions of images of the plurality of pairs of punch holes in the read image of the adjustment sheet.

8. The image processing device according to claim 2, wherein the punch hole former is configured to form a plurality of pairs of punch holes in the stacked portion of the adjustment sheet,
wherein, in each pair of the plurality of pairs of punch holes, a first punch hole is formed on the one side of the fold line and a second punch hole is formed on the another side of the fold line, and
wherein the position identifying unit is configured to calculate the actual position of the fold line using calculated actual positions of images of the plurality of pairs of punch holes in the read image of the adjustment sheet.

9. The image processing device according to claim 7, wherein the position identifying unit is configured to calculate, for each pair of the plurality of pairs of punch holes, a central position equidistant from calculated actual positions of the first punch hole and the second punch hole, and
wherein the position identifying unit is configured to calculate the position of the fold line using the calculated central positions.

10. The image processing device according to claim 8, wherein the position identifying unit is configured to calculate, for each pair of the plurality of pairs of punch holes, central position equidistant from calculated actual positions of the first punch hole and the second punch hole, and
wherein the position identifying unit is configured to calculate the position of the fold line using the calculated central positions.

11. The image processing device according to claim 9, wherein, for each pair of the plurality of pairs of punch holes, calculated actual positions of images of the first punch hole and the second punch hole are each a position of an inner end of a corresponding one of the first punch hole and the second punch hole.

12. The image processing device according to claim 10, wherein, for each pair of the plurality of pairs of punch holes, calculated actual positions of images of the first punch hole and the second punch hole are each a position of an inner end of a corresponding one of the first punch hole and the second punch hole.

13. A method comprising:
controlling folding of an adjustment sheet along a fold line using a reference fold position;
forming a pair of punch holes in a stacked portion of the adjustment sheet, created by the folding of the adjustment sheet,
wherein one punch hole of the pair of punch holes is formed on one side of the fold line and another punch hole of the pair of punch holes is formed on another side of the fold line opposite to the one side of the fold line;
reading an image of the adjustment sheet in which the pair of punch holes has been formed, with the adjustment sheet unfolded; and
calculating an actual position of the fold line, after the fold line has been formed, using at least calculated actual positions of images of the pair of punch holes appearing in the read image of the read adjustment sheet.

14. An image processing device comprising:
at least one processor configured to control a fold unit configured to control folding of an adjustment sheet along a fold line using a reference fold position;
a punch hole former configured to form a pair of punch holes in a stacked portion of the adjustment sheet, created by the folding of the adjustment sheet,
wherein one punch hole of the pair of punch holes is formed on one side of the fold line and another punch hole of the pair of punch holes is formed on another side of the fold line opposite to the one side of the fold line;
an image reader configured to read an image of the adjustment sheet in which the pair of punch holes has been formed, with the adjustment sheet unfolded; and wherein the at least one processor is further configured to execute a position identifying means configured to calculate an actual position of the fold line, after the fold line has been formed, using at least calculated actual positions of images of the pair of punch holes appearing in the read image of the adjustment sheet.

* * * * *